United States Patent
Akiyama

[11] Patent Number: 6,041,174
[45] Date of Patent: Mar. 21, 2000

[54] METHOD OF SIMULATING OXIDATION ENHANCED DIFFUSION BY SOLVING PARTIAL DIFFERENTIAL EQUATION

[75] Inventor: Yutaka Akiyama, Tokyo, Japan

[73] Assignee: NEC Corporation, Tokyo, Japan

[21] Appl. No.: 09/084,912

[22] Filed: May 28, 1998

[30] Foreign Application Priority Data

May 29, 1997 [JP] Japan .................................... 9-139995

[51] Int. Cl.[7] ................................................. G06F 17/50
[52] U.S. Cl. .............................. 395/500.33; 395/500.23; 395/500.26
[58] Field of Search ....................... 395/500.33, 500.23, 395/500.26, 500.27

[56] References Cited

U.S. PATENT DOCUMENTS

| | | | |
|---|---|---|---|
| 5,583,789 | 12/1996 | Dahm et al. | 364/496 |
| 5,640,331 | 6/1997 | Dahm et al. | 364/496 |
| 5,677,846 | 10/1997 | Kumashiro | 364/488 |
| 5,819,073 | 10/1998 | Nakamura | 395/500 |

OTHER PUBLICATIONS

Michitada Morisue, "VLSI Design–Process Simulation", pp. 50–63, (1987) (No English Translation).
"Process Device Simulation Technology", pp. 92–123 (Partial English Translation).
Seiichi Isomae, "Semiconductor process Device Simulation Technology", pp. 79–89, (1994) (No English Translation).

*Primary Examiner*—Kevin J. Teska
*Assistant Examiner*—Thai Phan
*Attorney, Agent, or Firm*—Foley & Lardner

[57] ABSTRACT

A process simulator for an oxidation enhanced diffusion formulates an enhanced velocity of diffusion coefficient into a partial differential equation expressed as (div grad $F_{OED}$= $F_{OED}$), and solves the partial differential equation through a conversion of discrete representation under the boundary conditions containing an oxidizing velocity at the boundary between a silicon layer and a silicon oxide layer so that the program sequence becomes simple.

6 Claims, 9 Drawing Sheets

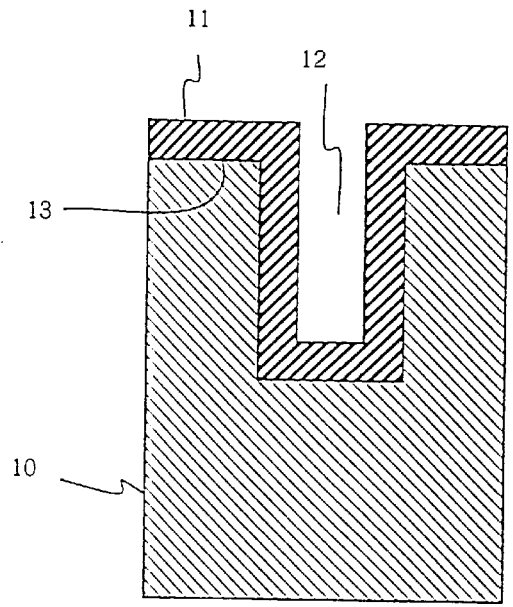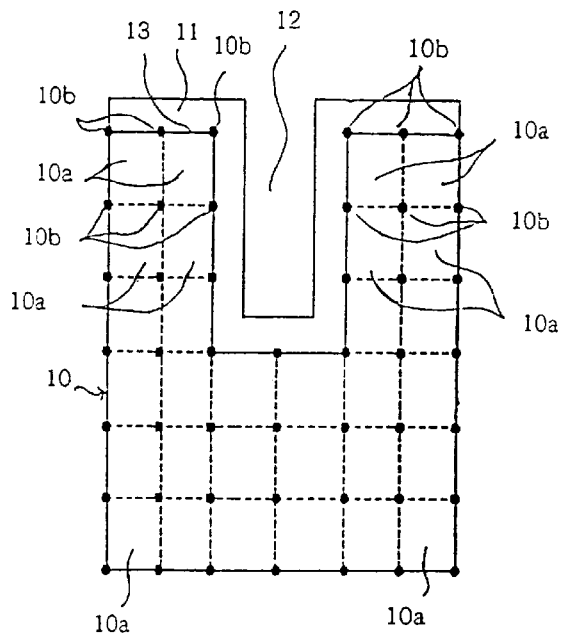
Fig. 7A    Fig. 7B
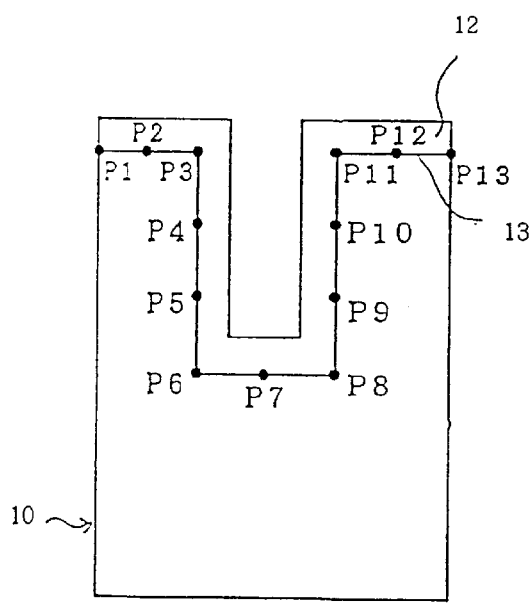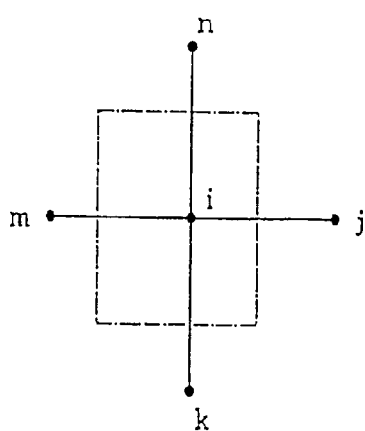
Fig. 7C    Fig. 7D

METHOD OF SIMULATING OXIDATION ENHANCED DIFFUSION BY SOLVING PARTIAL DIFFERENTIAL EQUATION

FIELD OF THE INVENTION

This invention relates to a method of process simulation and, more particularly, to a method of simulating an oxidation step and a diffusion step in a semiconductor fabrication process.

DESCRIPTION OF THE RELATED ART

Semiconductor manufacturers previously simulate an oxidation step, a diffusion step and an ion-implantation step during development of a semiconductor device, and a computer system for the simulation is called as "process simulator". The semiconductor manufacturer forecasts a physical quantity and a profile in a semiconductor substrate through the process simulation, and optimizes the characteristics of a circuit component. For example, a thermal oxidation is assumed to be required after an ion-implantation of dopant impurity into a semiconductor substrate. The implanted dopant impurity forms an initial profile in the semiconductor substrate, and is diffused during the thermal oxidation. The impurity profile is affected by the thermal oxidation, and is deformed. The influence is simulated by the process simulator, and the semiconductor manufacturer determines the final impurity profile and the configuration of the oxide layer. The process simulation is advantageous over fabrication of a prototype followed by an analysis, because the development time and the development cost are drastically reduced.

The variation is modeled, and is expressed by equations. For example, the oxidation and the diffusion may respectively be expressed by Deal-Grove equation and the following equation as written by Michitada MORISUE in "VLSI Design—Process Simulation" published by CMC Corporation in 1987. Equation 1 is the Deal-Grove equation, and equations 2 and 3 express the diffusion.

$$dTox/dt = B/(2Tox^{old} + A) \quad (1)$$

where t is time in oxidation, Tox is the thickness of an oxide layer at the present time, $Tox^{old}$ is the thickness of the oxide layer at a previous time and A and B are parameters of oxidizing velocity.

$$dC/dt = 1(dj/dx) \quad (2)$$

$$J = -D(dC/dx) \quad (3)$$

where C is an impurity, J is flux of the impurity and D is the diffusion coefficient.

Boron and phosphorous are affected by the ambience. The diffusion in oxidation ambience is faster than diffusion in nitrogen ambience. This phenomenon is called as "oxidation enhanced diffusion". In order to exactly simulate the impurity profile, it is necessary to take the oxidation enhanced diffusion into account. The aforementioned book teaches one-dimensional diffusing phenomenon in oxidation ambience and a simulation method for the one-dimensional oxidation enhanced diffusion. In equation 3, the oxidation enhanced diffusion increments the diffusion coefficient D at length x from the boundary of oxidation, and the increment of diffusion coefficient AD is expressed by equation (4).

$$\Delta D = F_{OED}(D^0 + D^+ + D^- + D^=) \quad (4)$$

where $F_{OED}$ is enhanced velocity of diffusion coefficient and expressed by equation 5.

$$F_{OED} = U(dTox X/dt)^{0.5} exp(x/Lg) \quad (5)$$

where U is a proportional constant, x is the length from the boundary of oxidation and Lg is the diffusion length in silicon interstitial.

Taking the increment of diffusion coefficient into account, the one-dimensional oxidation enhanced diffusion is simulated as shown in FIG. 1. The boundary between silicon and silicon oxide is indicated by "P". The oxidizing velocity (dTox/dt) at the boundary is calculated by equation 1. Node j is spaced from the boundary P by length x, and the increment ΔD of the diffusion coefficient at node j is given by equations 4 and 5. The increment Δ D is dependent on the decrease of the diffusion length Lg.

A field oxide grown through a LOCOS (Local Oxidation of Silicon) process or a trench isolation is formed in a semiconductor integrated circuit device, and electrically isolates the circuit components from one another. In other words, the isolating region defines active regions in the major surface of the semiconductor substrate, and the active regions are selectively assigned to the circuit components. This means that the isolating region is two dimensionally grown on the major surface of the semiconductor substrate. For this reason, the one-dimensional oxidation enhanced diffusion model is not appropriate for the isolating region, and a two-dimensional model is required for the process simulation. A typical example of the two-dimensional oxidation enhanced diffusion model is disclosed by Seiichi ISOMAE in "Semiconductor Process Device Simulation Technology", volume 1 "Process", chapter 2 "Process Simulation", paragraph 3 "Simulation for Two-Dimensional Oxidation", pages 79 to 89, 1994.

FIG. 2 illustrates the prior art simulating method for two-dimensional oxidation enhanced diffusion, and FIG. 3 shows the two-dimensional oxidation enhanced diffusion model. A silicon layer 1 forms a boundary 2 together with a silicon oxide layer 3. The prior art simulation firstly solves Laplace equation representative of oxidant diffusion in the silicon oxide layer 3 as by step SP1. The laplace equation is expressed as follows.

$$Dox(div \; grad \; Cox) = 0 \quad (6)$$

Then, oxidant concentration Csurf at the boundary 2 is obtained.

Subsequently, the oxidizing velocity dTox/dt is calculated from the oxidant concentration Csurf as by step SP2. Equation 7 defines the relation between the oxidizing velocity dTox/dt and the oxidant concentration Csurf at the boundary.

$$dTox/dt = K \cdot Csurf \quad (7)$$

Using the oxidizing velocity dTox/dt as the boundary conditions, the dimensions of the oxide layer 3 are updated as by step SP3.

As similar to the prior art simulation for the one-dimensional oxidation enhanced diffusion, it is necessary to calculate variation of the impurity concentration dispersion by solving a diffusion equation as by step SP4. In detail, the diffusion coefficient D is increased depending upon the oxidizing velocity at the boundary 2 and the length from the boundary 2. In the two-dimensional oxidation enhanced diffusion model, the oxidizing velocity is calculated at plural points P1, P2, P3, P4, P5 and P6 along the boundary 2 (see FIG. 3), and the length is varied together with the point P1 to P6. Finally, using the diffusion coefficient D, the diffusion equation is solved so as to determine an impurity profile in the silicon layer 1 as by step SP5.

As described in connection with step SP4, the oxidation velocity is calculated at the plural points P1 to P6. In the calculation, the enhanced velocity of diffusion coefficient $F_{OED}$ is calculated for all the combinations between the plural points P1 to P6 and node j by using equation 5, and the maximum value is employed. However, if there is a trench 4, the enhanced velocity of diffusion coefficient $F_{OED}$ is calculated for the combinations with points P1 to P6, and other combinations with points P7 to P13 are ignored. This is because of the fact that the silicon oxide crosses lines between node j and points P7 to P13. Thus, it is necessary to check all the combinations to see whether different material intersects the lines between the plural points P1 to Pn and node j.

FIGS. 5A and 5B illustrate a method of calculating the enhanced velocity of diffusion coefficient. The prior art method is described on the assumption that the prior art simulator executes the program sequence for the silicon structure shown in FIG. 4. The prior art simulator firstly calculates the oxidizing velocity dTox/dt at all points Pi along the boundary between the silicon oxide layer 3 and the silicon layer 1 as by step SP11. Equation 7 gives the oxidizing velocity dTox/dt to each point Pi. In the example shown in FIG. 4, suffix (i) is from 1 to 13.

Subsequently, the prior art simulator selects the first node Nj=1 in the silicon layer 1 as by step SP12, and specifies the first point Pi=1 on the boundary 2 as by step SP13. The prior art simulator draws a line between the first node N1 and the first point P1, and checks the silicon structure to see whether or not the line crosses any region formed of non-silicon material as by step SP14.

If the answer at step SP14 is given affirmative, the prior art simulator proceeds to step SP18, which is described hereinlater. However, the line is drawn between point P1 and node N1 without any intersection of non-silicon material. Then, the prior art simulator proceeds to step SP15, and calculates the enhanced velocity of diffusion coefficient $F_{OED}$ for the node N1. The enhanced velocity of diffusion coefficient $F_{OED}$ for the node Nj is hereinbelow represented as "$F_{OED}$ (ij)".

The prior art simulator compares the maximum enhanced velocity of diffusion coefficient $F_{OED\ MAX}$ with the enhanced velocity of diffusion coefficient $F_{OED}$ (11). The prior art simulator does not calculate any enhanced velocity of diffusion coefficient $F_{OED}$ (ji) before the combination of node N1 and point P1, and, for this reason, the answer at step SP16 is given affirmative. Then, the prior art simulator proceeds to step SP17, and the enhanced velocity of diffusion coefficient $F_{OED}$ (11) is stored as the maximum enhanced velocity of diffusion coefficient $F_{OED\ MAX}$.

Subsequently, the prior art simulator proceeds to step SP18, and checks points Pi to see whether or not lines are drown to all the points Pi. Only the point P1 has been taken into account, and the answer at step SP18 is given negative. Then, the prior art simulator increments parameter i by 1 as by step SP19, and returns to the step SP14. In this way, the prior art simulator reiterates the loop consisting of steps SP14 to SPl9 until the answer at step SP18 is given affirmative.

While the prior art simulator is repeating the loop, the lines between node N1 and points P1 to P13 are checked whether or not any non-silicon region intersects them at step SP14. If any line crosses the non-silicon region, the prior art simulator does not calculate the enhanced velocity of diffusion coefficient $F_{OED}$ (ij) for the point Pi, and directly proceeds to step SP18 without execution of steps SP15 to SP17. In the example shown in FIG. 4, the lines between node N1 and points P7 to P13 cross the silicon oxide layer 3, and the prior art simulator does not calculate the enhanced velocity of diffusion coefficient $F_{OED}$ for points P7 to P13. On the other hand, when the answer at step SP14 is given negative, the prior art simulator calculates the enhanced velocity of diffusion coefficient $F_{OED}$ (ji) for the points Pi, and compares the enhanced velocity of diffusion coefficient $F_{OED}$ with the maximum enhanced velocity of diffusion coefficient $F_{OED\ MAX}$ at step SP16. If the enhanced velocity of diffusion coefficient $F_{OED}$ (ij) is less than the maximum enhanced velocity of diffusion coefficient $F_{OED\ MAX}$, the prior art simulator proceeds to step SP18 without execution of step SP17. For this reason, when the answer at step SP18 is changed to the positive answer, the maximum enhanced velocity of diffusion coefficient $F_{OED\ MAX}$ is left in a suitable register for the node N1. Then, the prior art simulator proceeds to step SP19, and calculates the diffusion coefficient for the node N1.

Subsequently, the prior art simulator proceeds to step SP20, and checks to see whether or not all the nodes Nj are combined with points Pi. When the prior art simulator reaches step SP20 for the first time, only the node N1 was examined, and the answer at step SP20 is given negative. Then, the prior art simulator increments the parameter j by 1 as by step SP21, and returns to step SP13. The prior art simulator reiterates the loop consisting of steps SP13 to SP20 for the next node Nj, and repeats the loop consisting of steps SP13 to SP21 until the answer at step SP20 is given affirmative.

When the answer at step SP20 is given affirmative, the diffusion coefficient is determined at all the nodes Nj in the silicon layer 1, and the prior art simulator terminates the program sequence.

Thus, the prior art simulator simulates the two-dimensional oxidation enhanced diffusion, and forecasts the final dimensions of the silicon oxide layer 3 and the electric properties of the impurity region.

A problem inherent in the prior art simulation method is complicated program sequence. As described in connection with FIGS. 5A and 5B, the prior art simulator selects the combinations between the nodes Nj and the points Pi at step SP14, and calculates the enhanced velocity of diffusion coefficient $F_{OED}$ (ij) for the selected combinations between nodes Nj and points Pi as candidates. Finally, the prior art simulator selects the maximum enhanced velocity of diffusion coefficient $F_{OED\ MAX}$ from the candidates. Thus, the program sequence is complicated, and the prior art simulator consumes large amount of time and labor.

SUMMARY OF THE INVENTION

It is therefore an important object of the present invention to provide a method of simulation for an oxidation enhanced diffusion which is simpler than the prior art simulation method.

To accomplish the object, the present invention proposes to formulate an enhanced velocity of diffusion coefficient into a partial differential equation.

In accordance with one aspect of the present invention, there is provided a method of simulating an oxidation enhanced diffusion comprising the steps of preparing an objective semiconductor structure having a first region of oxidizable material and a second region of oxide, virtually dividing the first region into a plurality of sub-regions, calculating an oxidizing velocity at a boundary between the first region and the second region, formulating an enhanced velocity of diffusion coefficient into a partial differential equation under boundary conditions containing the oxidizing velocity, the enhanced velocity of diffusion coefficient varying a diffusion coefficient in the first region depending upon a length from the boundary, solving the partial differential equation through a conversion into a discrete representation so as to determine the enhanced velocity of diffusion coefficient at nodes in the first region, calculating a variation of a diffusion coefficient on the basis of the enhanced velocity of diffusion coefficient and calculating the diffusion coefficient.

BRIEF DESCRIPTION OF THE DRAWINGS

The features and advantages of the method will be more clearly understood from the following description taken in conjunction with the accompanying drawings in which:

FIGS. 7A to 7B are views showing a semiconductor structure serving as an object of the process simulation;

FIG. 7C shows lattice points assigned to a boundary;

FIG. 7D is a view showing lattice points imaged in the semiconductor structure;

DESCRIPTION OF THE PREFERRED EMBODIMENTS

First Embodiment

Figure 1:
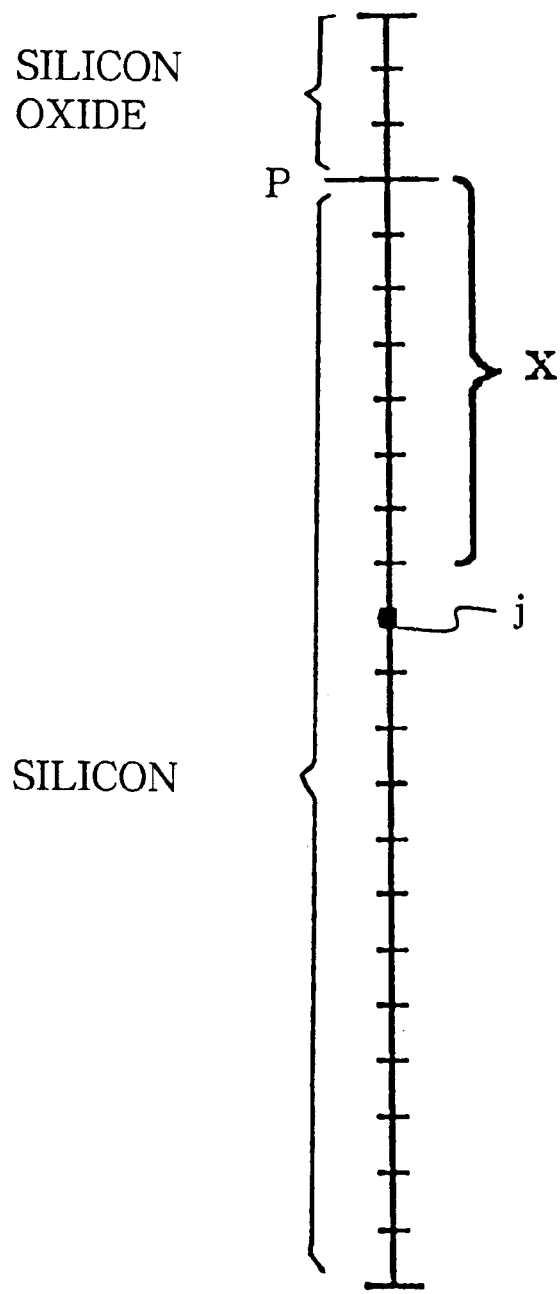
FIG. 1 is a view showing the prior art model of the one-dimensional oxidation enhanced diffusion.
Figure 2:
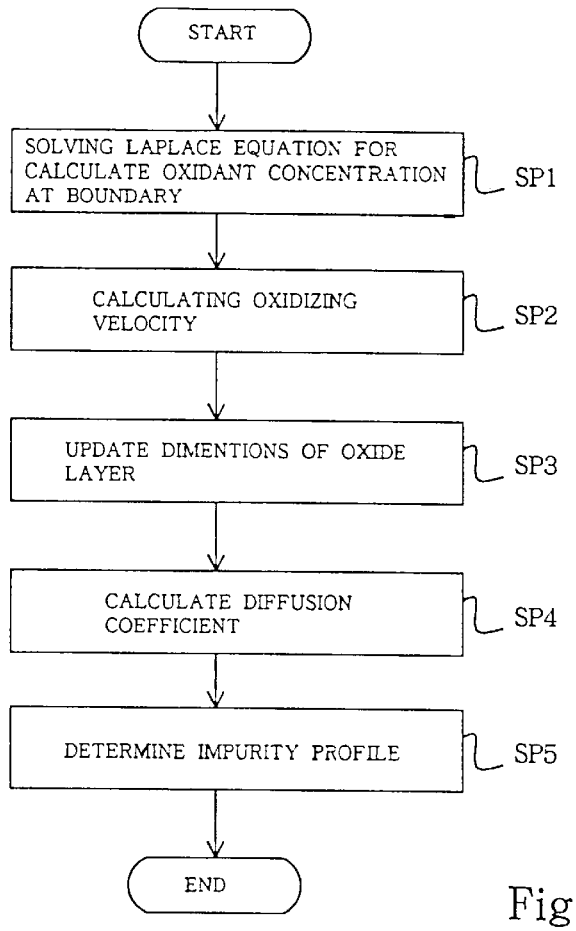
FIG. 2 is a flow chart showing the program sequence of the prior art simulation for the two-dimensional oxidation enhanced diffusion model.
Figure 3:
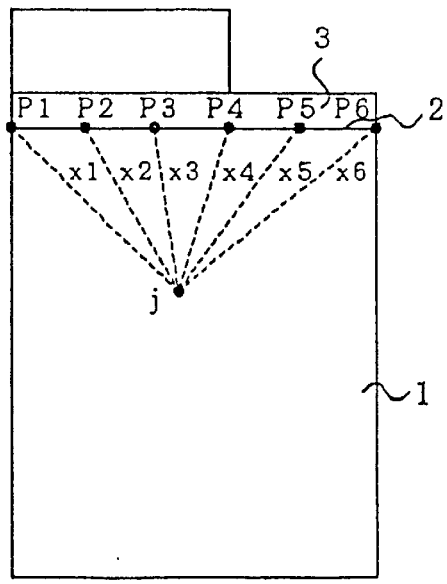
FIG. 3 is a schematic view showing the calculation of the enhanced velocity of diffusion coefficient in the two-dimensional oxidation enhanced diffusion model.
Figure 4:
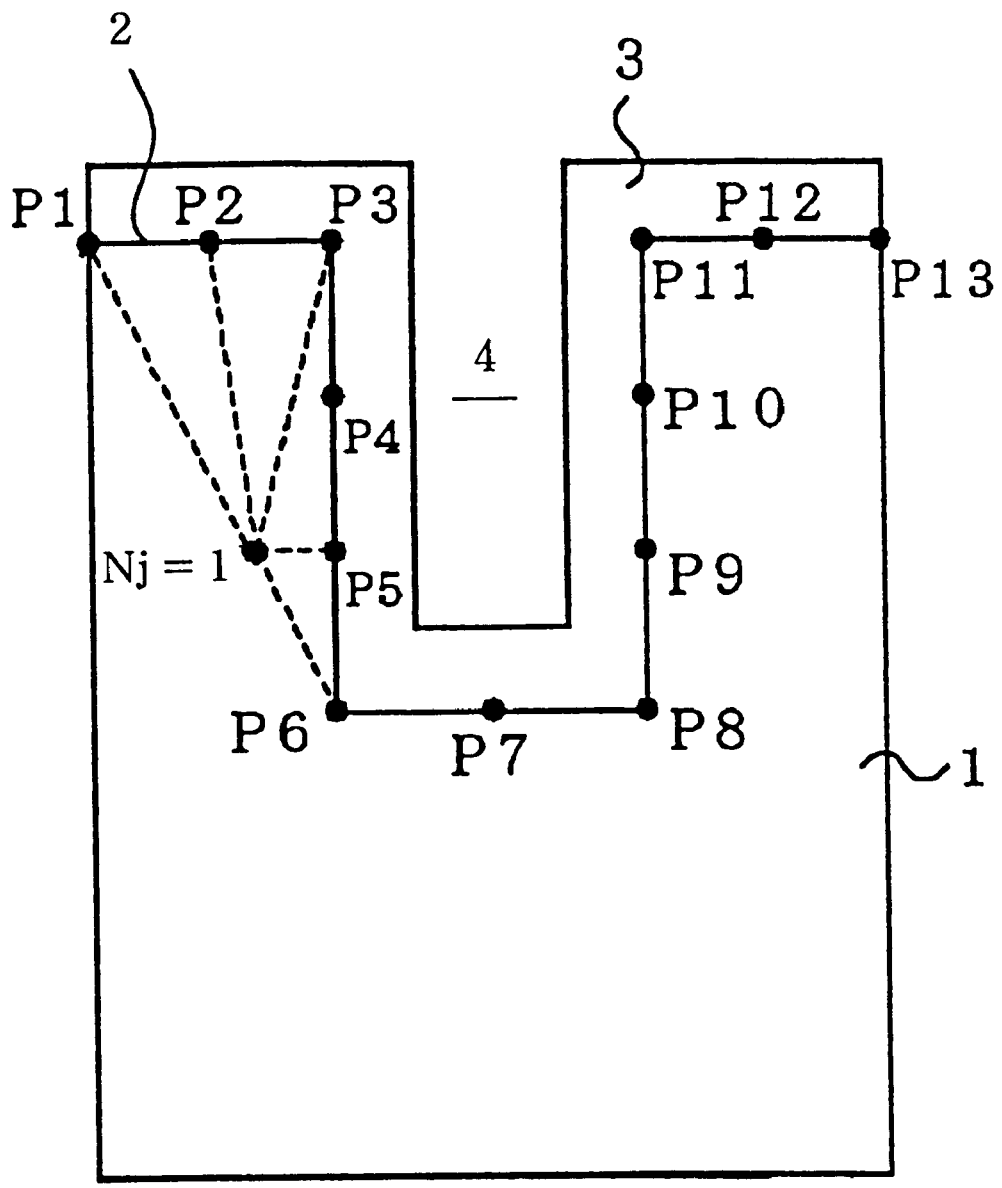
FIG. 4 is a schematic view showing the calculation of the enhanced velocity of diffusion coefficient in the two-dimensional oxidation enhanced diffusion model having the trench.
Figure 5A:
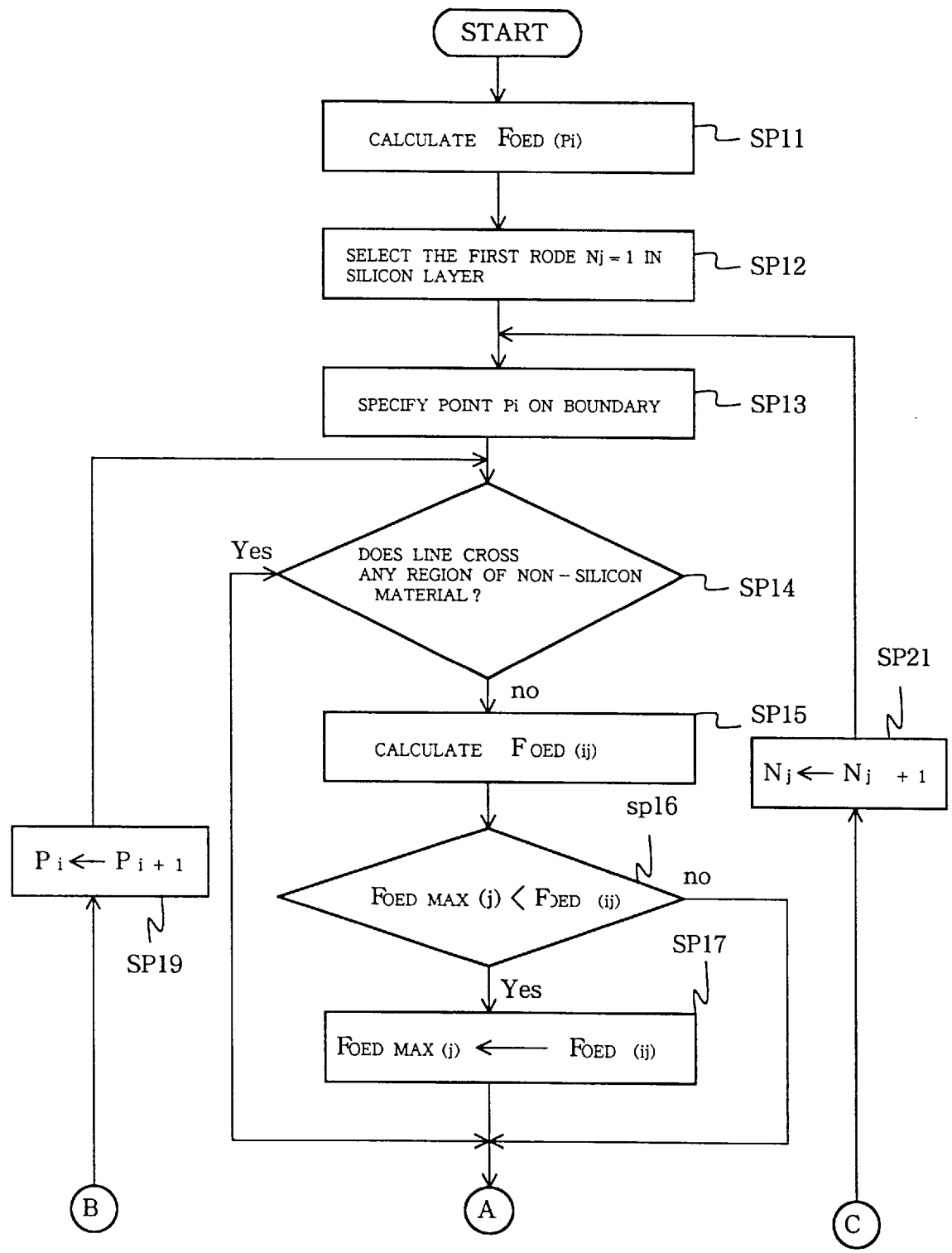
FIGS. 5A and 5B are flow charts showing the program sequence of the two-dimensional calculation for the enhanced velocity of diffusion coefficient.
Figure 5B:
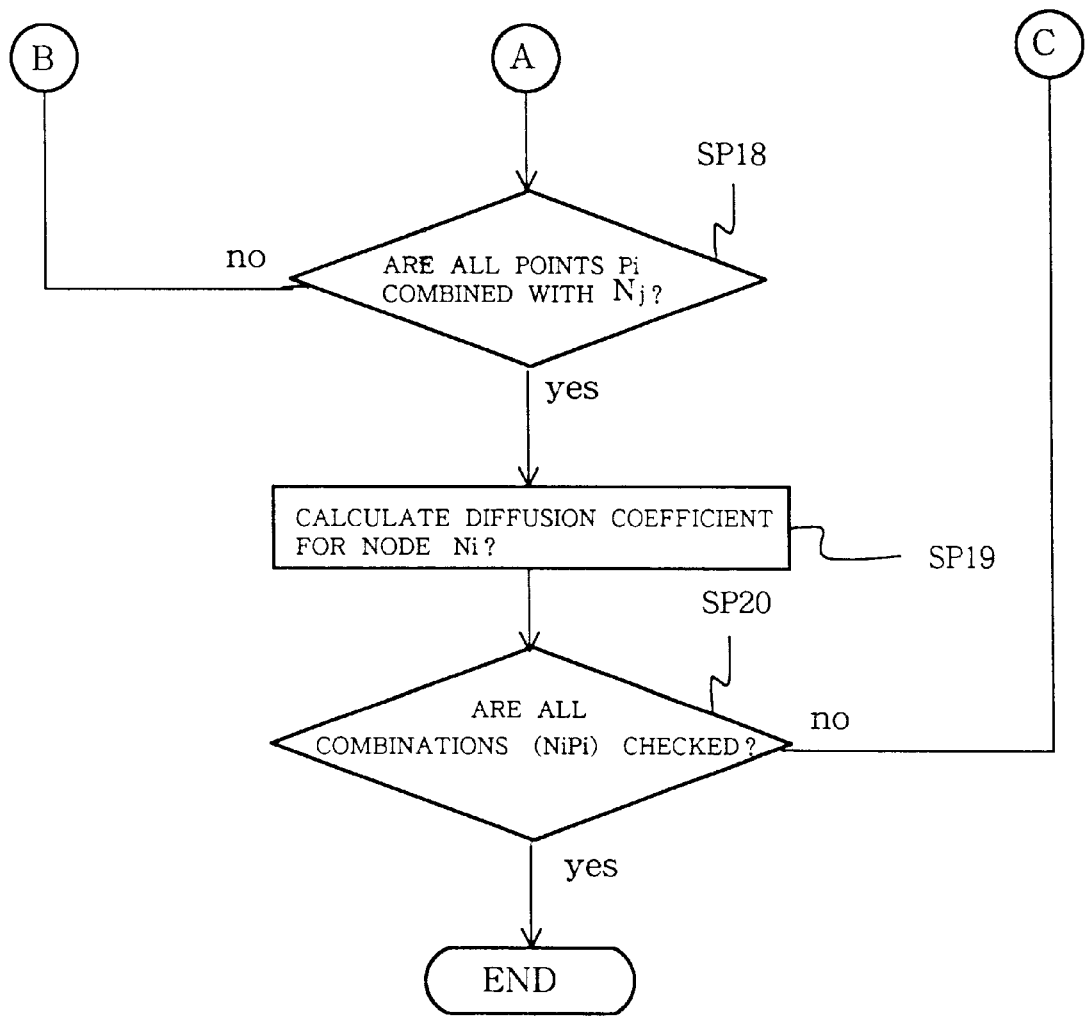
Figure 6:
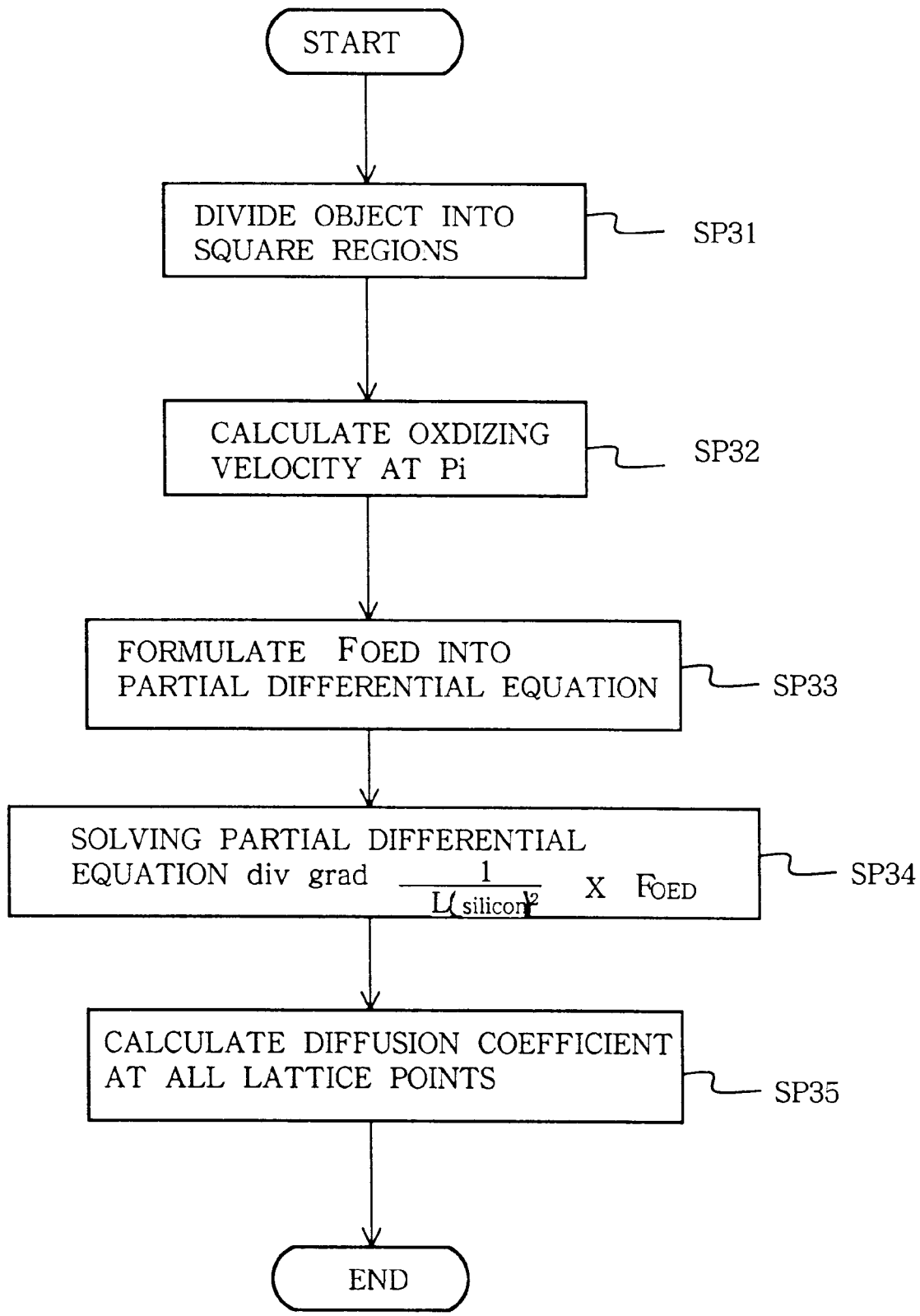
FIG. 6 is a flow chart showing a sequence of a program process simulation for a two-dimensional oxidation enhanced diffusion according to the present invention.

Referring to FIG. 6 of the drawings, a process simulator firstly divides an object to be analyzed into square regions as by step SP31. The square regions are used for a discrete representation of a partial differential equation. Dan teaches how to divide the object into the small square regions in "Process Device Simulation Technology", pages 91 to 122, ****.

The object is, by way of example, formed from a silicon bulk 10 covered with a silicon oxide layer 11 (see FIG. 7A), and a trench 12 is formed in the semiconductor structure 10/11. The silicon bulk 10 and the silicon oxide layer 11 form a boundary 13. The silicon bulk 10 is divided into square regions 10a, and lattice points are located at the corners of the square regions 10a as shown in FIG. 7B. The lattice points on the boundary 13 are labeled with Pi where i is natural numbers. In this instance, P1 to P13 are assigned to the lattice points on the boundary 13, respectively, as shown in FIG. 7C. The diffusing velocity is calculated for each of the square regions.

Subsequently, the process simulator calculates the enhanced velocity of diffusion coefficient $F_{OED}$ at points Pi as by step SP32. In detail, an oxidant concentration at the boundary 13 is determined by solving the Laplace equation (see equation 6), and the oxidizing velocity at the boundary 13 is calculated from the oxidant concentration (see equation 7). In this instance, the oxidizing velocity is calculated at points P1 to P13.

Subsequently, the process simulator determines boundary conditions from the oxidizing velocity, and formulates the enhanced velocity of diffusion coefficient $F_{OED}$ into a partial differential equation (8) as by step SP33. The process simulator proceeds to step SP34, and solves the partial differential equation expressed as follows.

$$Div\ grad\ F_{OED} = F_{OED} \tag{8}$$

In order to solve the partial differential equation (8), the partial differential equation is converted to a discrete representation. The discrete representation is to describe an approximate expression equivalent to the partial differential equation by using unknown quantities at finite points. The discrete representation is disclosed in the aforementioned book "Process Device Simulation Technology", pages 113 to 122, and the lattice points 10b are used as the finite points. FIG. 7D shows the lattice points 10b of a square region 10a. An arbitrary lattice point 10b is indicated by "i", and the lattice points around "i" are labeled with "j", "k", "m" and "n". In the discrete representation, the partial differential equation is expressed at the arbitrary lattice point "i" and the related lattice points "j" to "n". When formulating at all the lattice points 10b, we obtain the following band matrix.

$$\begin{pmatrix} & & & 0 \\ & & 0 & \\ & 0 & & \\ 0 & & & \end{pmatrix} \begin{pmatrix} F_{OED}(1) \\ F_{OED}(i) \\ \vdots \\ F_{OED}(n) \end{pmatrix} = \begin{pmatrix} Boundary\ Conditions \\ 0 \\ \vdots \\ \end{pmatrix}$$

Solving the matrix, the enhanced velocity of diffusion coefficient $F_{OED}$ is given at all the lattice points 10b.

Subsequently, the process simulator calculates the increment of diffusion coefficient $\Delta D$, and determines the diffusion coefficient D at nodes in the silicon layer 10. The increment $\Delta D$ is expressed by equation (9), and the diffusion coefficient D is given by equation 10.

$$\Delta D = F_{OED}(D^0 + D^+ + D^- + D^=) \tag{9}$$

$$D = D0 + \Delta D \tag{10}$$

Using the diffusion coefficient D, the process simulator finally forecasts an impurity profile and electric properties of the impurity region.

As will be understood from the foregoing description, the simulation method according to the present invention expresses the enhanced velocity of diffusion coefficient $F_{OED}$ at all the lattice points 10b in the band matrix, and determines the enhanced velocity of diffusion coefficient $F_{OED}$ at each lattice point 10b without repetition of calculation. For this reason, the process simulation according to the present invention is simpler than the prior art process simulation, and decrease the time and labor.

Second Embodiment

Figure 8:
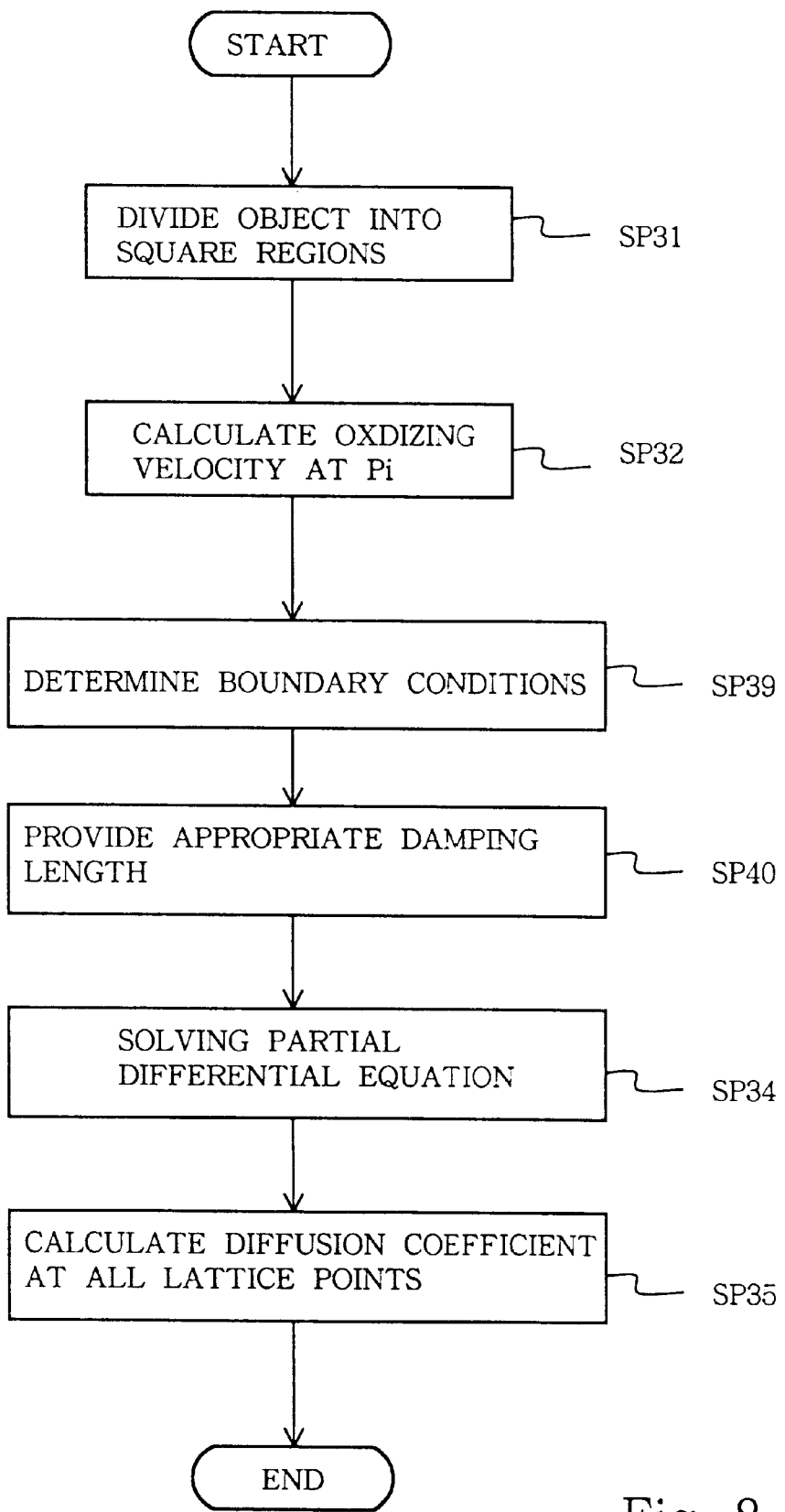
FIG. 8 is a flow chart showing another program sequence of the process simulation according to the present invention.
Figure 9A:
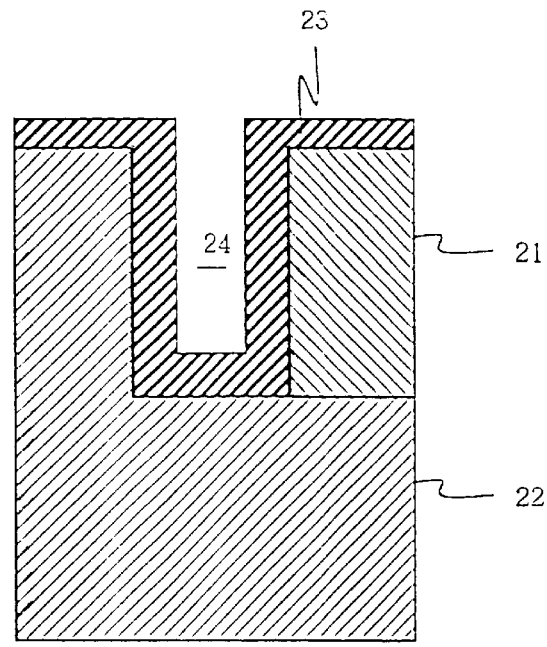
FIGS. 9A and 9B are views showing a semiconductor structure serving as an object of the process simulation.
Figure 9B:
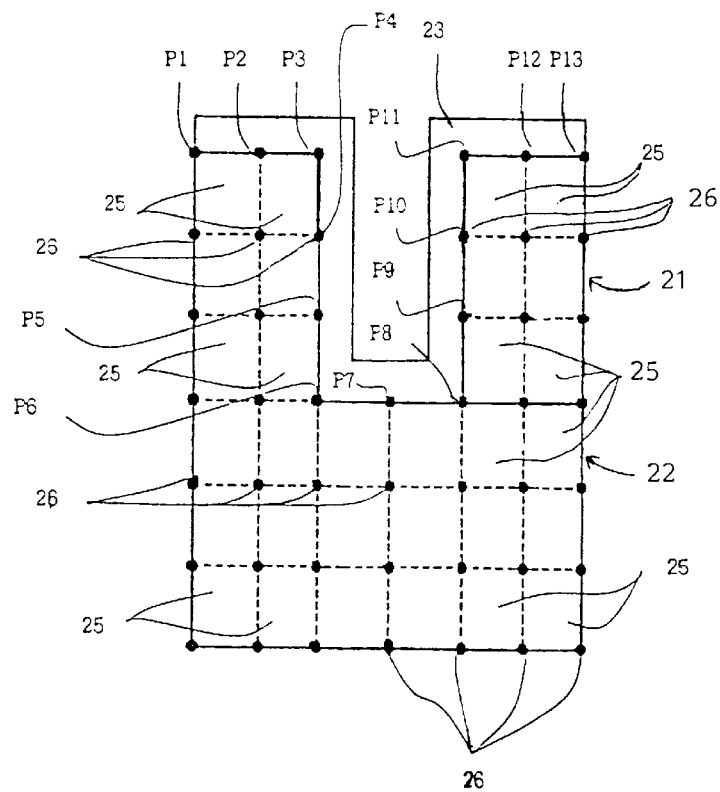

FIG. 8 illustrates another process simulation embodying the present invention. The process simulation is carried out for a semiconductor structure shown in FIGS. 9A and 9B. A polycrystalline silicon layer 21 is formed on a single crystalline silicon layer 22, and the polycrystalline silicon layer 21 and the single crystalline silicon layer 22 are covered with a silicon oxide layer 23. The silicon oxide layer 23 defines a trench 24. Thus, two kinds of oxidizable material are incorporated in the semiconductor structure.

The process simulation implementing the second embodiment is similar to that of the first embodiment except for steps SP39 and SP40. For this reason, the other steps are labeled with the same references as those of the process sequence implementing the first embodiment.

When a process simulator calculates the enhanced velocity of diffusion coefficient $F_{OED}$, the damping length L is different between the single crystalline silicon and the polycrystalline silicon, and additional step SP40 is inserted between step SP39 and step SP34. The process simulator solves the partial differential equation under the boundary conditions containing the damping length.

First, the process simulator divides the objective semiconductor structure into square regions 25 (see FIG. 9B) as by step SP31. Though not shown in FIG. 9B, lattice points 26 on the boundary are specified by Pi. Selected lattice points are labeled with "26" in FIG. 9B. The process simulator calculates the oxidizing velocity at point Pi as by step SP32, and determines boundary conditions as by step SP39.

Subsequently, appropriate damping length is given to each of the lattice points 26 as by step SP40. A lattice point 26 in the polycrystalline silicon layer 21 has a damping length L different from a damping length L at a lattice point 26 in the single crystalline silicon layer 22.

Using the boundary conditions given at step SP39 and the damping length L given at step SP40, the enhanced velocity of diffusion coefficient $F_{OED}$ is formulated into a partial differential equation, and is solved as by step SP34. The partial differential equation is expressed as follows.

$$Div\ grad\ F_{OED} = (1/L^2) F_{OED} \tag{11}$$

Subsequently, the process simulator calculates increment ΔD on the basis of the enhanced velocity of diffusion coefficient $F_{OED}$ as similar to the first embodiment (see equation 9), and determines the diffusion coefficient D by using equation 10.

As will be appreciated from the foregoing description, the method according to the present invention is simpler than the prior art simulation method, and decreases the time and labor for the process simulation.

Although particular embodiments of the present invention have been shown and described, it will be obvious to those skilled in the art that various changes and modifications may be made without departing from the spirit and scope of the present invention. The object may be divided into small triangle regions.

What is claimed is:

1. A method of simulating an oxidation enhanced diffusion for determining an impurity profile in a semiconductor structure, comprising the steps of:

a) preparing a semiconductor structure having a first region of oxidizable material and a second region of oxide;

b) virtually dividing said first region into a plurality of sub-regions;

c) calculating an oxidizing velocity at a boundary between said first region and said second region;

d) formulating an enhanced velocity of diffusion coefficient into a partial differential equation under boundary conditions containing said oxidizing velocity, said enhanced velocity of diffusion coefficient varying a diffusion coefficient in said first region depending upon a length from said boundary;

e) solving said partial differential equation through a conversion into a discrete representation so as to determine said enhanced velocity of diffusion coefficient at nodes in said first region;

f) calculating a variation of a diffusion coefficient on the basis of said enhanced velocity of diffusion coefficient;

g) calculating said diffusion coefficient; and h) determining an impurity profile in the semiconductor structure based on the diffusion coefficient.

2. The method as set forth in claim 1, in which said oxidizable material and said oxide are silicon and silicon oxide.

3. The method as set forth in claim 2, in which said partial differential equation is expressed as $$div\ grad\ F_{OED} = F_{OED}$$

where $F_{OED}$ represents said enhanced velocity of diffusion coefficient.

4. The method as set forth in claim 1, in which said first region is partially formed of single crystalline silicon and partially formed of polycrystalline silicon, and said second region is formed of silicon oxide.

5. The method as set forth in claim 4, in which said boundary conditions further contains a damping length of said enhanced velocity of diffusion coefficient, and said damping length is difference between said single crystalline silicon and said polycrystalline silicon.

6. The method as set forth in claim 5, in which said partial differential equation is expressed as $$div\ grad\ F_{OED} = (1/L^2) F_{OED}$$

where $F_{OED}$ represents said enhanced velocity of diffusion coefficient and L represents said damping length.

* * * * *